(12) United States Patent
Fan

(10) Patent No.: US 10,932,601 B1
(45) Date of Patent: Mar. 2, 2021

(54) CLAMPING DEVICE WITH CUP HOLDER

(71) Applicant: Eagle Fan, Hsinchu Hsien (TW)

(72) Inventor: Eagle Fan, Hsinchu Hsien (TW)

( * ) Notice: Subject to any disclaimer, the term of this patent is extended or adjusted under 35 U.S.C. 154(b) by 17 days.

(21) Appl. No.: 16/558,187

(22) Filed: Sep. 2, 2019

(51) Int. Cl.
*F16M 13/02* (2006.01)
*A47G 23/02* (2006.01)

(52) U.S. Cl.
CPC ......... *A47G 23/0225* (2013.01); *F16M 13/02* (2013.01); *A45F 2200/0516* (2013.01); *A45F 2200/0583* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,482,117 A | * | 11/1984 | Besek, Jr. | ............. A61J 9/0661 248/103 |
| 5,192,041 A | * | 3/1993 | Bryant | .................. A61J 9/0692 248/104 |
| 5,249,770 A | * | 10/1993 | Louthan | ................... A47K 1/09 248/205.2 |
| 5,745,565 A | * | 4/1998 | Wakefield | ........... B60R 11/0241 379/446 |
| 5,996,957 A | * | 12/1999 | Kurtz | ................. A47G 23/0225 248/231.21 |
| 6,663,068 B2 | * | 12/2003 | Huang | ............... A47G 23/0225 224/926 |
| 7,422,184 B2 | * | 9/2008 | Carnevali | .............. B60N 3/103 248/278.1 |
| 8,061,670 B1 | * | 11/2011 | White | ..................... B60R 11/02 248/311.2 |
| 8,500,076 B2 | * | 8/2013 | Lai | ......................... B60N 3/103 248/311.2 |
| 8,978,947 B1 | * | 3/2015 | Schneidau | .............. B60R 11/02 224/409 |
| 9,682,738 B1 | * | 6/2017 | Silva | ........................ B62J 11/00 |
| 9,831,904 B1 | * | 11/2017 | Carnevali | ............. G06F 1/1632 |
| 10,512,322 B2 | * | 12/2019 | Washington | ........... F16M 11/14 |
| 10,531,755 B1 | * | 1/2020 | Huang | ...................... F16B 2/10 |
| 10,588,812 B2 | * | 3/2020 | Brockway | ................ A61H 1/00 |
| 10,667,654 B2 | * | 6/2020 | Schultz | ................. A47L 13/512 |
| 2011/0001022 A1 | * | 1/2011 | Edinger | .................. B25B 5/068 248/103 |
| 2018/0001835 A1 | * | 1/2018 | Corso | ..................... H04M 1/04 |
| 2018/0271310 A1 | * | 9/2018 | Klugh | .................... A45C 13/28 |

* cited by examiner

*Primary Examiner* — Monica E Millner
(74) *Attorney, Agent, or Firm* — Lin & Associates Intellectual Property, Inc.

(57) ABSTRACT

A clamping device for attaching a container and a mobile device to a handlebar of a stroller includes a clamp, a cup holder and a clamping assembly. The clamp has a first clamping arm and a second clamping arm. The cup holder is mounted to the first clamping arm for receiving a container and includes a positioning member and a receiving member, an outer wall of the container is positioned by the positioning member and the bottom portion of the container is supported by the receiving member. The clamping assembly has a connecting joint, a supporting member and a clamping unit. The upper and lower ends of the connecting joint are respectively pivotally connected to the bottom of the supporting member and the top of the second clamping arm, and the clamping unit is mounted on the supporting member and used for clamping a mobile device.

14 Claims, 6 Drawing Sheets

CLAMPING DEVICE WITH CUP HOLDER

TECHNICAL FIELD

The technical field generally relates to a clamping device with cup holder, and in particular, to a design able to be attached to the handle of a baby stroller or a pet stroller and to be used to hold a mobile phone or a container at the same time.

BACKGROUND

A stroller is one of the most basic equipment for people with child or pet. A baby stroller provides mobility to carry a baby who is unable to walk or a child who cannot walk for too long. A pet stroller allows the owner to bring the pets to a variety of occasions with minimal inconvenience to others. Therefore, the baby strollers and pet strollers are very practical equipment.

Adults take their babies out of the house and usually carry bottled or canned containers filled with water, milk, formula, and so on for drinking. In addition, people will also carry a mobile phone when going out, so that they can easily contact others or watch movies. At present, the baby strollers or pet strollers generally do not provide functions to hold mobile phones or containers at the same time. When the baby stroller is moving, the bottles or the mobile phones must be taken from the bag for the babies and young children to drink water or to use the mobile phone, which is inconvenient. In addition, it is not always safe with one hand pushing the cart while using a mobile phone in the other hand.

SUMMARY

The object of the present invention is to provide to provide a clamping device with cup holder. The clamping device can hold the mobile phone and has a cup holder for holding a container at the same time. The clamping device can also be easily fixed to the handle of the baby stroller or the pet stroller, so that the user can conveniently move the cart while using the phone or retrieving the container for drinking.

To achieve the above object, the clamping device with a cup holder of the present invention comprises: a clamp, a cup holder and a clamping assembly; the clamp comprising a first clamping arm and a second clamping arm; the first clamping arm and the second clamping arm being able to clamp onto a place to be attached; the cup holder being mounted to the first clamping arm, for receiving a container; the cup holder comprising a positioning member and a receiving member, an outer wall of the container being positioned by the positioning member and a bottom portion of the container being supported by the receiving member; the clamping assembly comprising a connecting joint, a supporting member and a clamping unit; an upper end and a lower end of the connecting joint being respectively pivotally connected to a bottom of the supporting member and a top of the second clamping arm; the clamping unit being mounted on the supporting member and being used for clamping a mobile phone.

In a preferred embodiment of the present invention, the clamp further comprises an extension rod and a screwing member, the extension rod is fixed at one end to the first clamping arm, and the second clamping arm is sheathed over the periphery of the extension rod and can linearly move along the extension rod; an outer wall of the extension rod has an external thread, and the screwing member is screwed to the external thread.

In a preferred embodiment of the present invention, the first clamping arm has a side wall facing away from the second clamping arm, and the positioning member and the receiving member are respectively mounted on upper and lower positions of the side wall, and the positioning member has a shape of a C-shaped clip, and the receiving member has an L-shaped body in a longitudinal direction.

In a preferred embodiment of the present invention, the positioning member and the receiving member are pivotally connected to the side wall; in a folded state, the positioning member and the receiving member are pulled to flip to an angle and then stack at the top of the first clamping arm.

In a preferred embodiment of the present invention, the clamping unit is rotatably mounted to the supporting member.

In a preferred embodiment of the present invention, the connecting joint comprises a first pivot shaft and a second pivot shaft; the first pivot shaft is pivotally connected to the top of the second clamping arm, and has a first extension member at an intermediate position; the second pivot shaft is pivotally connected to bottom of the supporting member, and has a second extension member at an intermediate position; the first extension member and the second extension member abut each other and can rotate.

In a preferred embodiment of the present invention, when folding, the pivotal positions of the connecting joint with the first clamping arm and the supporting member are adjusted to change the positions of the members to make the first clamping arm, the second clamping arm and the clamping unit all sequentially arranged side by side.

In summary, the present invention has the following effects:
1. For the users of baby strollers and pet strollers, the present invention can provide a platform for placing mobile phones and containers, so that the mobile phone can be used at any time when the stroller is pushed or the container can be used for drinking;
2. It is easy to use, and it is very easy and quick to operate, whether to be fixed on the handle of the stroller, or holding the mobile phone, or placing the container;
3. When the present invention is not in use, the clamping device can be folded to reduce the space occupied.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

Figure 1:
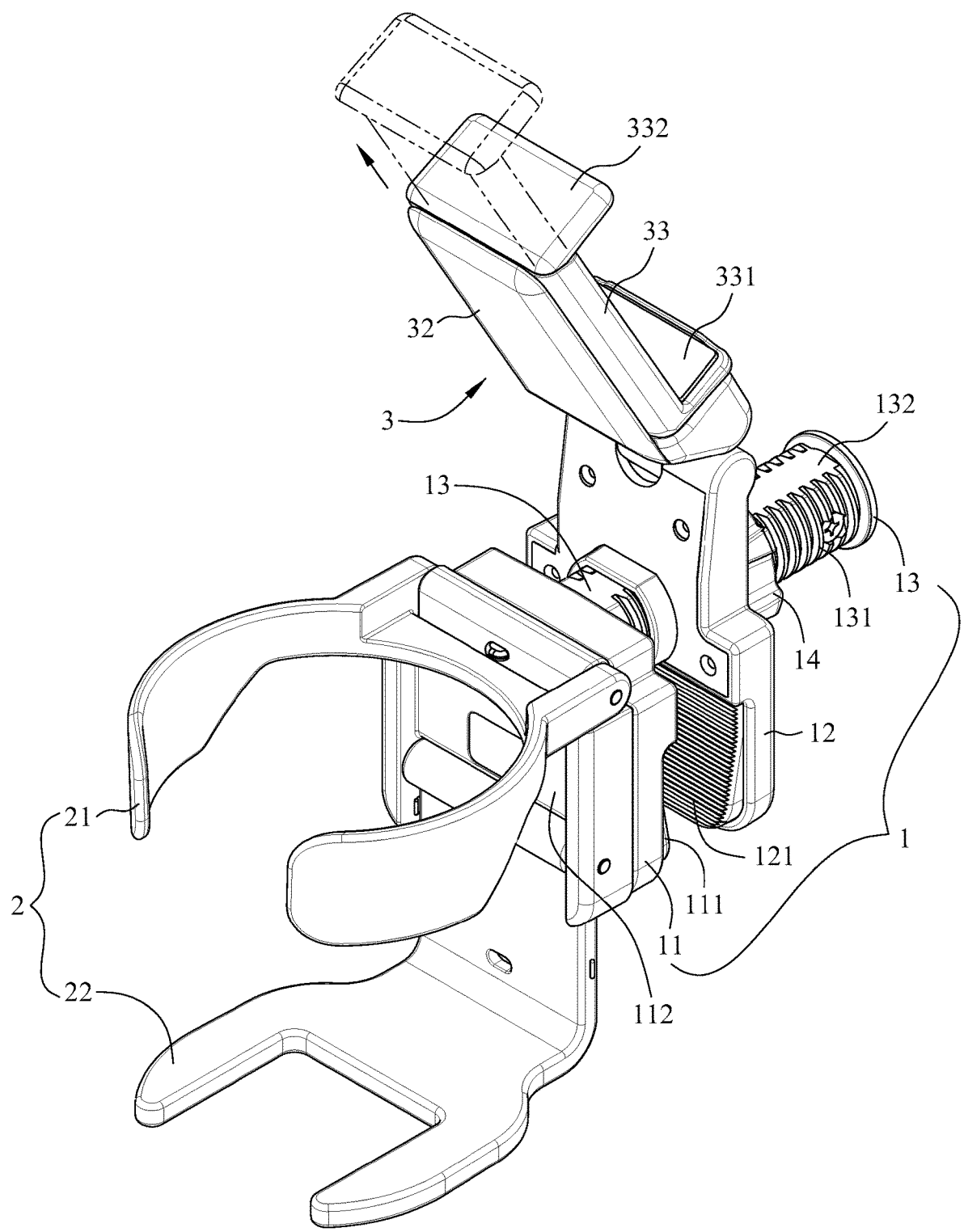
FIG. 1 shows a schematic view of the present invention.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
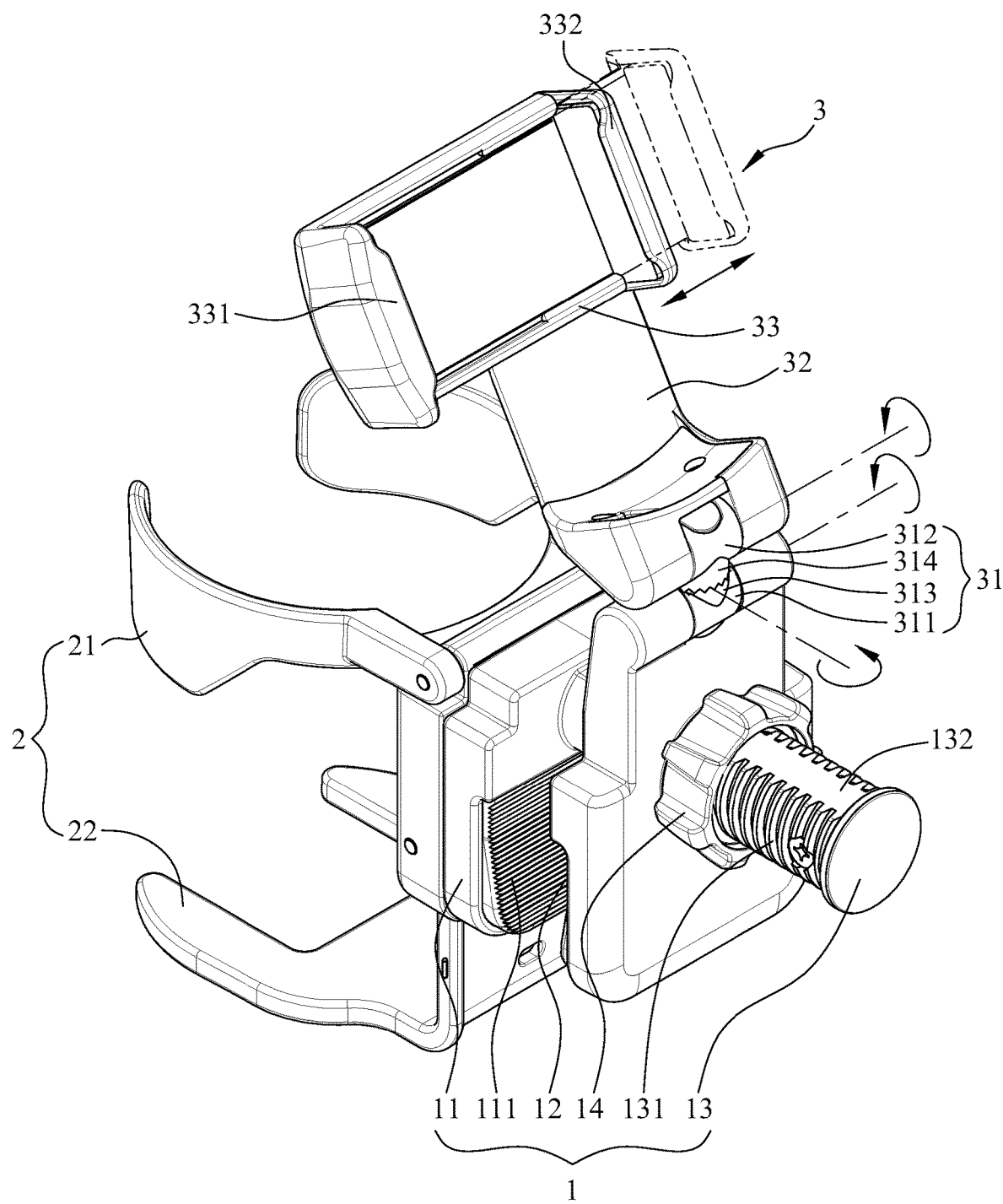
FIG. 2 shows a schematic view from another angle of the present invention.

FIG. 1 and FIG. 2 show a schematic view from different angles according to an exemplary embodiment of the present invention respectively. As shown in the present embodiment, the clamping device with cup holder of the present invention comprises a clamp 1, a cup holder 2 and a clamping assembly 3. The clamp 1 is used to clamp onto a place for the clamping device of the present invention to be attached to. In the present invention, the clamping device is to clamp onto the handle of a baby stroller or a pet stroller. The cup holder 2 is for placing a bottle or a can container. The clamping assembly 3 is for clamping onto for holding a mobile phone. The cup holder 2 and the clamping assembly 3 are respectively engaged to the two sides of the clamp 1 for better balance when both hold a mobile phone and a container simultaneously.

The following describes the components of the present invention in details:

The clamp 1 comprises a first clamping arm 11 and a second clamping arm 12. The first clamping arm 11 and the second clamping arm 12 are able to move towards each other to clamp onto a place to be attached. In the present embodiment, the clamp 1 further comprises an extension rod 13 and a screwing member 14. The extension rod 13 is fixed at one end to the first clamping arm 11, and the second clamping arm 12 is sheathed over periphery of the extension rod 13 and can linearly move along the extension rod 13. The outer wall of the extension rod 13 has an external thread 131, and the screwing member 14 is screwed to the external thread 131. The extension rod 13 is not a circular shaft, and the axial partial outer wall has at least a flat surface 132. In the present embodiment, two flat surfaces 132 are disposed correspondingly above and below. The flat surface 132 is disposed so that the second clamping arm 12 can only move linearly along the extension rod 13 between the first clamping arm 11 and the screwing member 14 but does not rotate. In addition, the first clamping arm 11 further has a beveled and non-flat first clamping surface 111, and the second clamping arm 12 also has a second clamping surface 121 which is also beveled and non-flat. The space formed by the first clamping surface 111, the second clamping surface 121 and the extension rod 13 can be clamped onto the handle of the stroller.

The cup holder 2 is for receiving a container. The cup holder 2 comprises a positioning member 21 and a receiving member 22. The outer wall of the container is positioned by the positioning member 21 and the bottom of the container is supported by the receiving member 22. The first clamping arm 11 has a side wall 112 facing away from the second clamping arm 12, and the positioning member 21 and the receiving member 22 are respectively mounted on upper and lower positions of the side wall 112. The positioning member 21 has a shape of a C-shaped clip, and the receiving member 22 has an L-shaped body in longitudinal direction.

Figure 3:
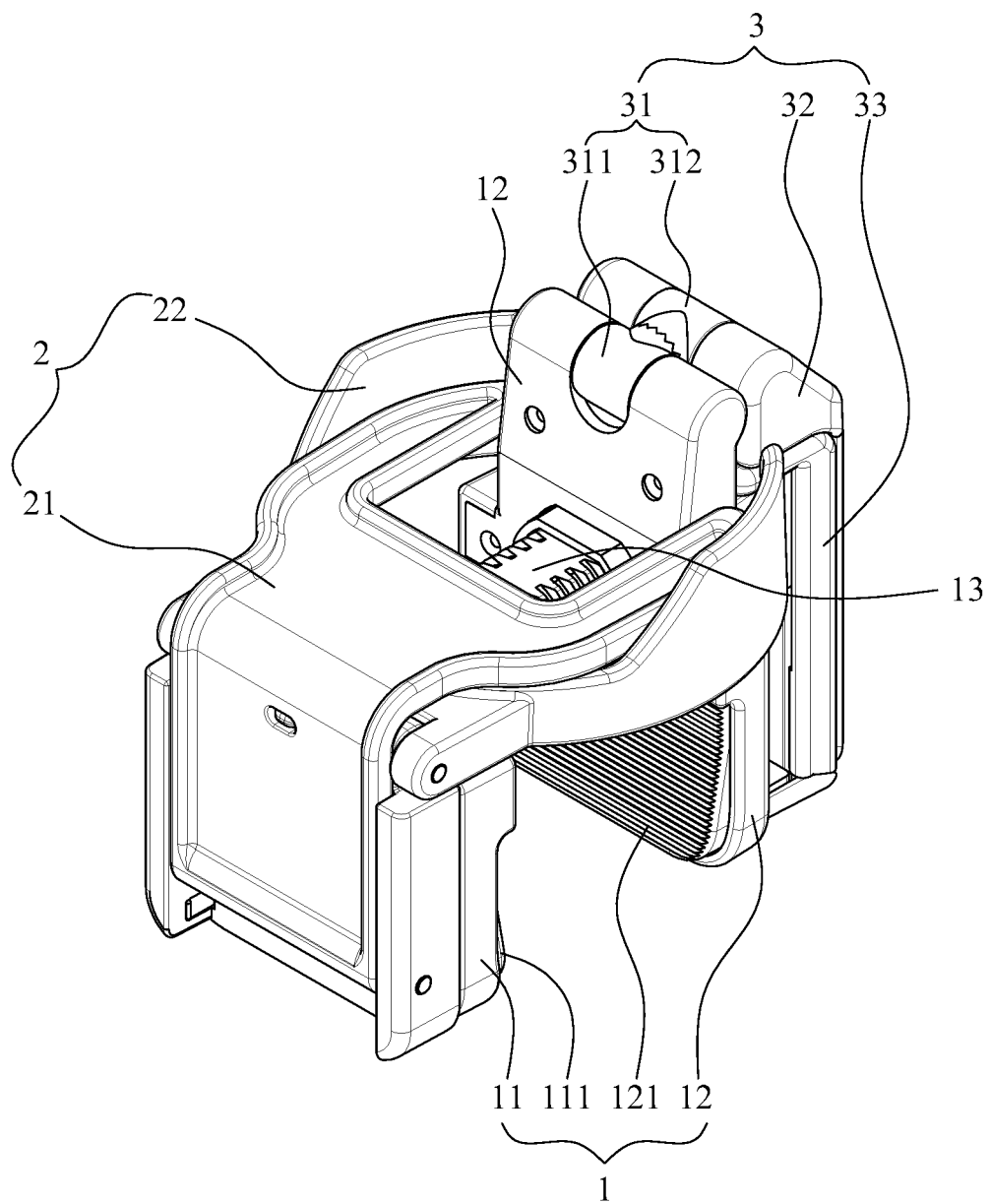
FIG. 3 shows a schematic view of the present invention in a folded state.

Moreover, as shown in FIG. 3, when folding, the positioning member 21 and the receiving member 22 can be flipped by 180° and stacked on the top of the first clamping arm 11, thereby reducing the space required for storage.

The clamping assembly 3 is for clamping to hold a mobile phone, and is mounted and connected to the top of the second clamping arm 12. The clamping assembly 3 can be of various types, and the present embodiment describes only one of the various types. The clamping assembly 3 comprises a connecting joint 31, a supporting member 32 and a clamping unit 33. An upper end and a lower end of the connecting joint 31 are respectively pivotally connected to the bottom of the supporting member 32 and the top of the second clamping arm 21.

The clamping unit 3 is mounted on the supporting member and being used for clamping a mobile phone.

In the embodiment, in order to adjust the connecting joint 31 for more various angles, the connecting joint 31 comprises a first pivot shaft 311 and a second pivot shaft 312. The first pivot shaft 311 is pivotally connected to the top of the second clamping arm 12 and has a first extension member 313 at an intermediate position. The second pivot shaft 312 is pivotally connected to the bottom of the support member 32, and has a second extension member 314 at an intermediate position. The first extension member 313 and the second extension member 314 abut each other and are rotatable. As shown in FIG. 2, the connecting joint 31 can provide three different axial adjustment modes, and the pivotal joints have an elastic positioning structure with the tooth surface, so that the adjusted relative position is not loosened.

Figure 4:
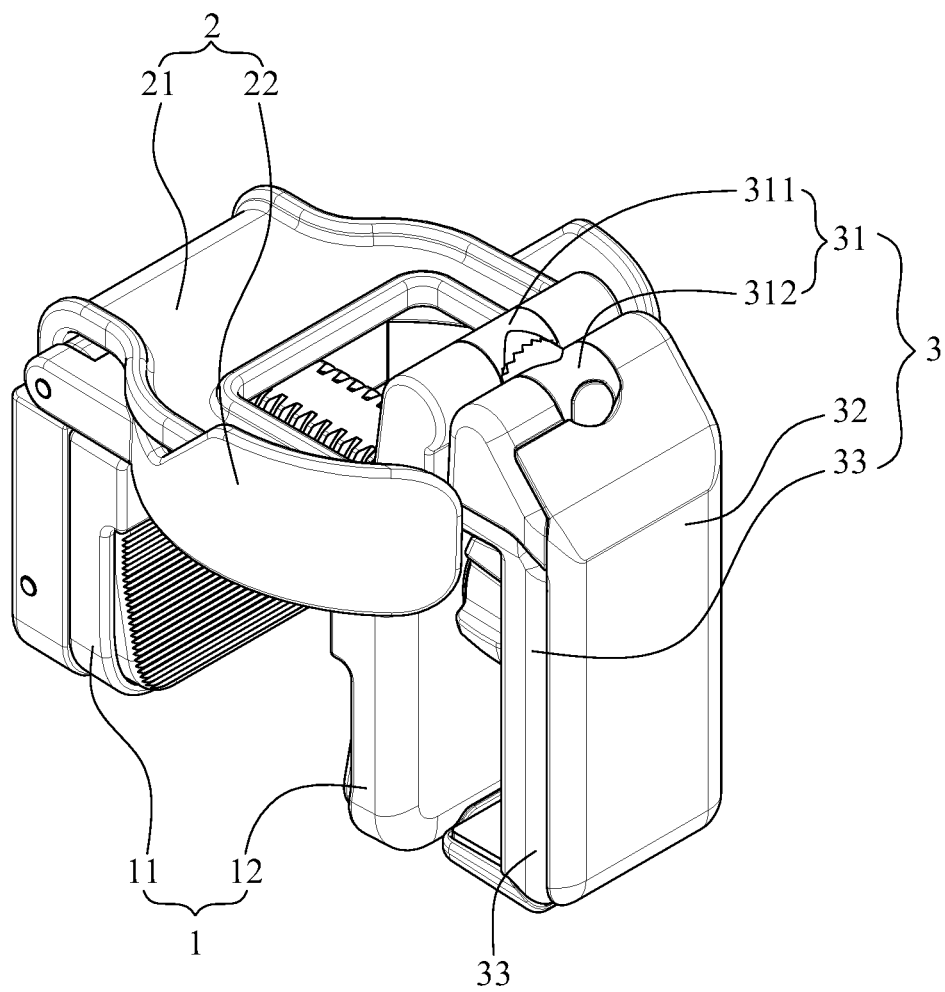
FIG. 4 shows a schematic view from another angle of the present invention in a folded state.

The clamping unit 33 is used to hold a mobile phone, which is the common structure, and FIG. 1 and FIG. 2 provide different usage scenarios. The clamping unit 33 comprises a first clamping member 331 and a second clamping member 332. The second clamping member 332 can move linearly and the elasticity of an internal spring is utilized to maintain the clamping force of the second clamping member 332. In the present embodiment, the clamping unit 33 is in a unidirectional moving clamping mode, but may also be a two-way moving clamping mode. In addition, the bottom of the clamping unit 33 is pivotally connected to the support member 32 in an offset manner, so that the clamping unit 33 can be adjusted to an upright or horizontal shape (such as FIG. 1 or FIG. 2) so that the mobile phone can be used vertically or horizontally. In addition, as shown in FIG. 3 and FIG. 4, at the time of folding, the second clamping arm 12 is adjusted to move to the end position of the extension rod 13, and the pivotal position of the connecting joint 31 with each member is adjusted so that the clamping unit 33 is sequentially arranged side by side at an outer side of the second clamping arm 12 to save space for storage.

Figure 5:
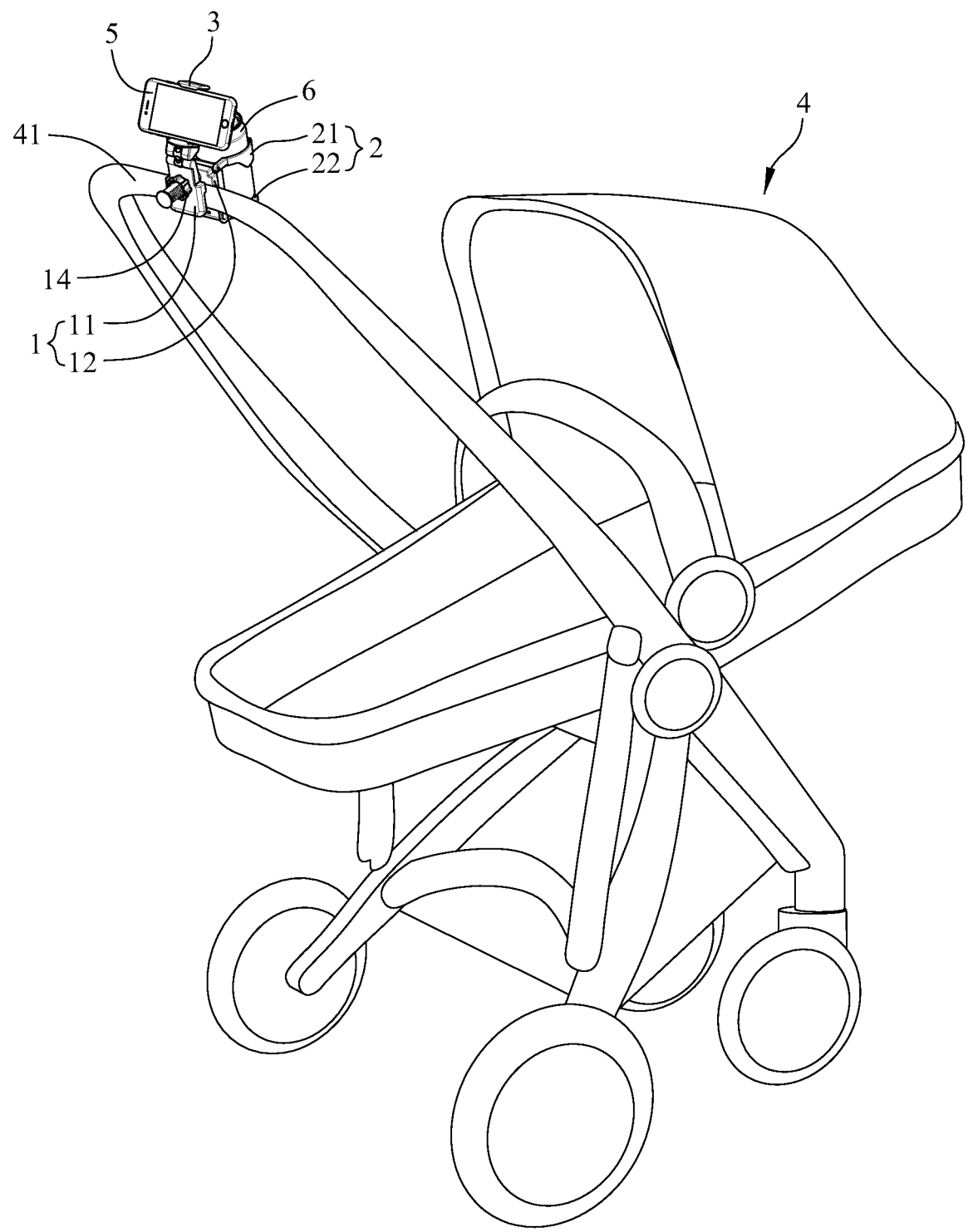
FIG. 5 shows a schematic view of the present invention applied to a baby stroller.
Figure 6:
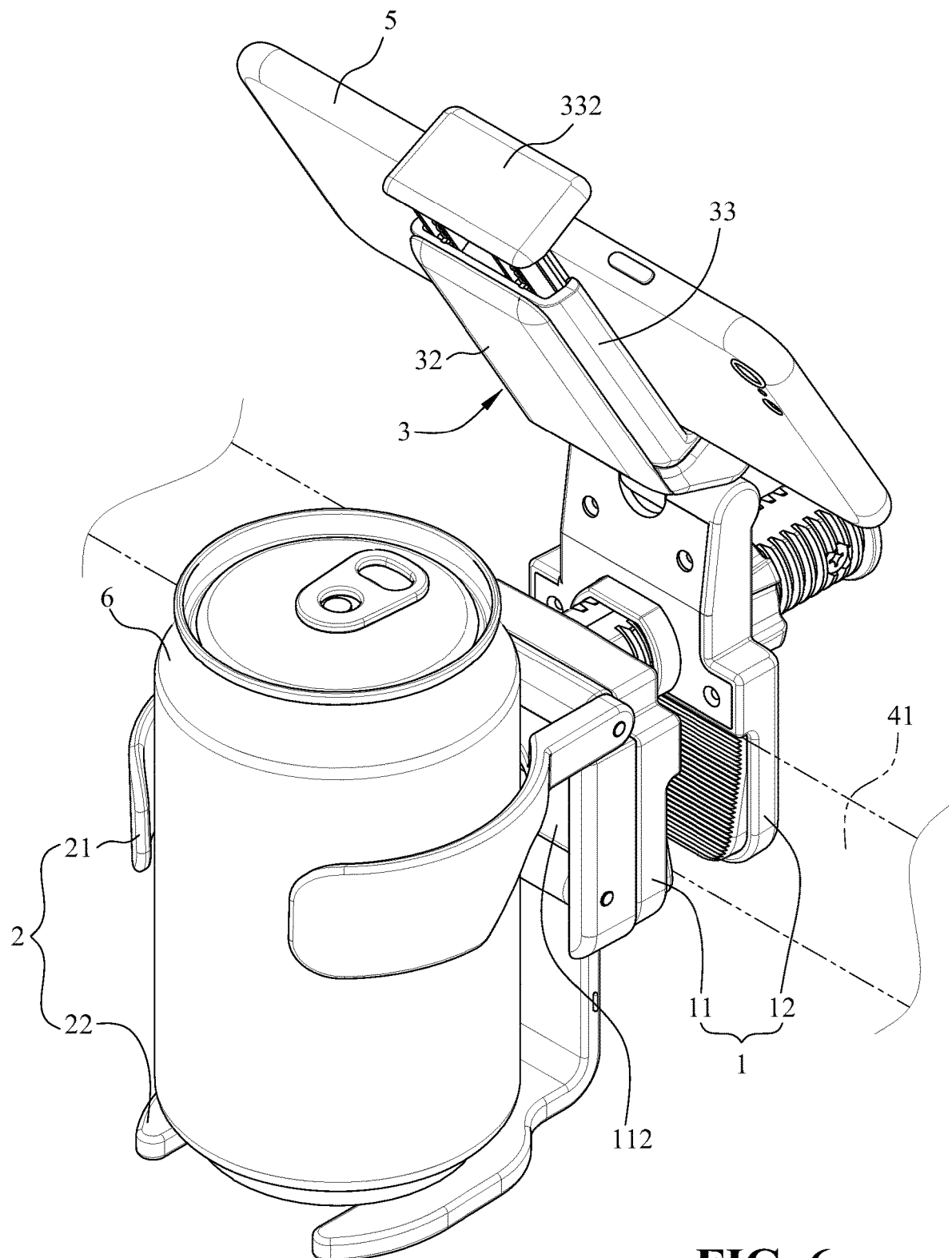
FIG. 6 shows an enlarged view of the present invention in use.

FIG. 5 and FIG. 6 are schematic views of the present invention when used in a bay stroller. The user can clamp the first clamping arm 11 and the second clamping arm 12 of the clamp 1 onto the handle 41 of a baby stroller 4, and the screwing member 14 is rotated to increase the clamping force. The positioning member 21 and the receiving member 22 are pulled, so that the two are located at the direction of the side wall 112 of the first clamping arm 11. The connecting joint 31 is adjusted so that the clamping unit 33 is located above the second clamping arm 12. As such, the user can hold a mobile phone 5 by the clamping unit 33, and a container 6 is placed in the positioning member 21 and is supported by the receiving member 22. When the user pushes the baby stroller 4 with both hands, the user can watch the mobile phone, and it is also convenient to pick up the container 6 for drinking.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A clamping device for attaching a container and a mobile device to a handlebar of a stroller, comprising:
   a clamp, further comprising a first clamping arm and a second clamping arm; the first clamping arm and the second clamping arm being able to clamp onto a place to be attached;
   a cup holder, being mounted to the first clamping arm, for receiving the container, and comprising a positioning member and a receiving member, an outer wall of the container being positioned by the positioning member and a bottom portion of the container being supported by the receiving member; and
   a clamping assembly, further comprising a connecting joint, a supporting member and a clamping unit; an upper end and a lower end of the connecting joint being respectively pivotally connected to a bottom of the supporting member and a top of the second clamping arm; the clamping unit being mounted on the supporting member and being used for clamping the mobile device;
   wherein the clamp further comprises an extension rod and a screwing member, one end of the extension rod is fixed to the first clamping arm, and the second clamping arm is sheathed over a periphery of the extension rod and can linearly move along the extension rod; an outer wall of the extension rod has an external thread, and the screwing member is screwed to the external thread.

2. The clamping device as claimed in claim 1, wherein the first clamping arm has a side wall facing away from the second clamping arm, and the positioning member and the receiving member are respectively mounted on upper and lower positions of the side wall, and the positioning member has a shape of a C-shaped clip, and the receiving member has an L-shaped body in a longitudinal direction.

3. The clamping device as claimed in claim 2, wherein the positioning member and the receiving member are pivotally connected to the side wall; in a folded state, the positioning member and the receiving member are pulled to flip to an angle and then stack at a top of the first clamping arm.

4. The clamping device as claimed in claim 1, wherein the clamping unit is rotatably mounted to the supporting member.

5. The clamping device as claimed in claim 1, wherein the connecting joint comprises a first pivot shaft and a second pivot shaft; the first pivot shaft is pivotally connected to the top of the second clamping arm, and has a first extension member at an intermediate position; the second pivot shaft is pivotally connected to a bottom of the supporting member, and has a second extension member at an intermediate position; and the first extension member and the second extension member abut each other and can rotate.

6. The clamping device as claimed in claim 1, wherein when folding, pivotal positions of the connecting joint with the first clamping arm and the supporting member are adjusted to change the positions of the members to make the first clamping arm, the second clamping arm and the clamping unit all sequentially arranged side by side.

7. A clamping device for attaching a container and a mobile device to a handlebar of a stroller, comprising:
   a clamp, further comprising a first clamping arm and a second clamping arm; the first clamping arm and the second clamping arm being able to clamp onto a place to be attached;
   a cup holder, being mounted to the first clamping arm, for receiving the container, and comprising a positioning member and a receiving member, an outer wall of the container being positioned by the positioning member and a bottom portion of the container being supported by the receiving member; and
   a clamping assembly, further comprising a connecting joint, a supporting member and a clamping unit; an upper end and a lower end of the connecting joint being respectively pivotally connected to a bottom of the supporting member and a top of the second clamping arm; the clamping unit being mounted on the supporting member and being used for clamping the mobile device;
   wherein the first clamping arm has a side wall facing away from the second clamping arm, and the positioning member and the receiving member are respectively mounted on upper and lower positions of the side wall, and the positioning member has a shape of a C-shaped clip, and the receiving member has an L-shaped body in a longitudinal direction.

8. The clamping device as claimed in claim 7, wherein the positioning member and the receiving member are pivotally connected to the side wall; in a folded state, the positioning member and the receiving member are pulled to flip to an angle and then stack at a top of the first clamping arm.

9. The clamping device as claimed in claim 7, wherein the clamping unit is rotatably mounted to the supporting member.

10. The clamping device as claimed in claim 7, wherein the connecting joint comprises a first pivot shaft and a second pivot shaft; the first pivot shaft is pivotally connected to the top of the second clamping arm, and has a first extension member at an intermediate position; the second pivot shaft is pivotally connected to a bottom of the supporting member, and has a second extension member at an intermediate position; and the first extension member and the second extension member abut each other and can rotate.

11. The clamping device as claimed in claim 7, wherein when folding, pivotal positions of the connecting joint with the first clamping arm and the supporting member are adjusted to change the positions of the members to make the first clamping arm, the second clamping arm and the clamping unit all sequentially arranged side by side.

12. A clamping device for attaching a container and a mobile device to a handlebar of a stroller, comprising:
   a clamp, further comprising a first clamping arm and a second clamping arm; the first clamping arm and the second clamping arm being able to clamp onto a place to be attached;
   a cup holder, being mounted to the first clamping arm, for receiving the container, and comprising a positioning member and a receiving member, an outer wall of the container being positioned by the positioning member and a bottom portion of the container being supported by the receiving member; and
   a clamping assembly, further comprising a connecting joint, a supporting member and a clamping unit; an upper end and a lower end of the connecting joint being respectively pivotally connected to a bottom of the supporting member and a top of the second clamping arm; the clamping unit being mounted on the supporting member and being used for clamping the mobile device;

wherein the connecting joint comprises a first pivot shaft and a second pivot shaft; the first pivot shaft is pivotally connected to the top of the second clamping arm, and has a first extension member at an intermediate position; the second pivot shaft is pivotally connected to the bottom of the supporting member, and has a second extension member at an intermediate position; and the first extension member and the second extension member abut each other and can rotate.

13. The clamping device as claimed in claim 12, wherein the clamping unit is rotatably mounted to the supporting member.

14. The clamping device as claimed in claim 12, wherein when folding, pivotal positions of the connecting joint with the first clamping arm and the supporting member are adjusted to change the positions of the members to make the first clamping arm, the second clamping arm and the clamping unit all sequentially arranged side by side.

* * * * *